US008967698B2

(12) United States Patent
Werum et al.

(10) Patent No.: US 8,967,698 B2
(45) Date of Patent: Mar. 3, 2015

(54) CRASH STRUCTURE FOR A MOTOR VEHICLE

(75) Inventors: Daniel Werum, Obereisesheim (DE); Jan Lohmann, Henstedt-Ulzburg (DE); Nico Feindler, Stuttgart (DE)

(73) Assignee: Audi AG, Ingolstadt (DE)

( * ) Notice: Subject to any disclaimer, the term of this patent is extended or adjusted under 35 U.S.C. 154(b) by 98 days.

(21) Appl. No.: 13/988,725

(22) PCT Filed: Oct. 29, 2011

(86) PCT No.: PCT/EP2011/005482
§ 371 (c)(1),
(2), (4) Date: Jul. 26, 2013

(87) PCT Pub. No.: WO2012/069130
PCT Pub. Date: May 31, 2012

(65) Prior Publication Data
US 2014/0049031 A1     Feb. 20, 2014

(30) Foreign Application Priority Data
Nov. 22, 2010   (DE) .......................... 10 2010 052 135

(51) Int. Cl.
*B62D 25/08*     (2006.01)
*B62D 21/15*     (2006.01)
*F16F 7/12*       (2006.01)

(52) U.S. Cl.
CPC ................ *B62D 21/15* (2013.01); *B62D 25/08* (2013.01); *B62D 21/152* (2013.01); *F16F 7/12* (2013.01); *F16F 7/124* (2013.01)
USPC ..................................... 296/187.03; 280/751

(58) Field of Classification Search
CPC .......... B62D 25/08; B62D 21/157; F16F 7/12

USPC ..................................... 280/751; 296/187.03
See application file for complete search history.

(56) References Cited

U.S. PATENT DOCUMENTS 4,545,172 A * 10/1985 Wardill ....................... 52/783.14
4,948,196 A *  8/1990 Baba et al. ................ 296/187.12
(Continued)

FOREIGN PATENT DOCUMENTS

DE          197 39 467 A1     3/1998
DE          198 56 162 A1     6/2000
(Continued)

OTHER PUBLICATIONS

International Search Report issued by the European Patent Office in International Application PCT/EP2011/005482.

*Primary Examiner* — Nicole Verley
(74) *Attorney, Agent, or Firm* — Henry M. Feiereisen LLC

(57) ABSTRACT

The invention relates to a crash structure (10a, 10b, 10c, 10d, 10e, 10f) for a motor vehicle, having a crash element (12a, 12b, 12c, 12d, 12e, 12f), which is made at least partially of a fiber composite material, and a support unit (16a, 16b, 16c, 16d, 16e, 16f) having at least one support element (14a, 14.1b, 14.2b, 14c, 14d, 14e, 14f) and being connectable to a load-bearing structure (18) of the motor vehicle. According to the invention, the crash element (12a, 12b, 12c, 12d, 12e, 12f) is made of an undulated component with waves (22) in the vehicle longitudinal direction (20) and an end region (24) which is supported on the load-bearing structure (18) of the motor vehicle at least via the at least one support element (14a, 14.1b, 14.2b, 14c, 14d, 14e, 14f) of the support unit (16a, 16b, 16c, 16d, 16e, 16f) in the vehicle transverse direction (26).

10 Claims, 6 Drawing Sheets

(56) References Cited

U.S. PATENT DOCUMENTS

| | | | |
|---|---|---|---|
| 5,580,120 A * | 12/1996 | Nees et al. | 296/146.6 |
| 5,884,962 A | 3/1999 | Mattingly et al. | |
| 6,588,557 B2 | 7/2003 | Williams et al. | |
| 6,663,169 B2 * | 12/2003 | Gehringhoff et al. | 296/187.12 |
| 7,118,170 B2 * | 10/2006 | Montanvert et al. | 296/209 |
| 7,562,929 B2 * | 7/2009 | Schiebel et al. | 296/187.12 |
| 7,862,104 B2 * | 1/2011 | Kano et al. | 296/187.03 |
| 7,874,611 B2 * | 1/2011 | Wani et al. | 296/187.03 |
| 8,267,446 B2 * | 9/2012 | Gonin | 293/136 |
| 8,336,933 B2 * | 12/2012 | Nagwanshi et al. | 293/132 |
| 2004/0201255 A1 * | 10/2004 | Jonsson | 296/187.03 |
| 2009/0102235 A1 * | 4/2009 | Ajisaka | 296/187.03 |
| 2011/0210579 A1 * | 9/2011 | Marur et al. | 296/187.03 |
| 2014/0028053 A1 * | 1/2014 | Hihara | 296/187.12 |

FOREIGN PATENT DOCUMENTS

| | | |
|---|---|---|
| DE | 198 56 980 A1 | 6/2000 |
| DE | 10 2005 004 780 B3 | 9/2006 |
| DE | 10 2006 014 961 A1 | 10/2007 |
| DE | 10 2007 026 A1 | 12/2008 |

* cited by examiner

CRASH STRUCTURE FOR A MOTOR VEHICLE

CROSS-REFERENCES TO RELATED APPLICATIONS

This application is the U.S. National Stage of International Application No. PCT/EP2011/005482, filed Oct. 29, 2011, which designated the United States and has been published as International Publication No. WO 2012/069130 and which claims the priority of German Patent Application, Serial No. 10 2010 052 135.3, filed Nov. 22, 2010, pursuant to 35 U.S.C. 119(a)-(d).

BACKGROUND OF THE INVENTION

The invention relates to a crash structure for a motor vehicle crash.

Generic crash structures for motor vehicles are known in numerous variations. These crash structures are used to increase the safety in various configurations and at various locations in motor vehicles. In particular, crash elements made of carbon fiber reinforced plastics and fiber plastic composites are used primarily which are well-suited to absorb crash energy in motor vehicles because of possible weight savings and a very high weight-specific energy absorption. In racing, so-called crash cones are used for example. Other possibilities involve, for example, CFRP crash tubes or CFRP crash shafts. In the event of a vehicle impact, the impact energy, caused by the accident, is converted into deformation energy. This is achieved by providing the crash structure with a certain structural space, deforming the crash structure at least in parts in a crash situation to thereby absorb the impact energy, and then by transmitting the remaining impact energy to a body of a vehicle. These crash structures have been proven particularly useful in the front area and/or rear area of motor vehicles.

DE 10 2007 026 680 A1 discloses a generic crash structure for a motor vehicle with a crash element which is made of a fiber-reinforced plastic and reinforced in part with a fiber composite. The substantially one-piece crash structure is formed with a profile structure which is downwardly open and extends in vehicle longitudinal direction. Each of its two opposite ends of the crash structure has a support unit in vehicle transverse direction for support of the crash structure on a load-bearing structure of the motor vehicle.

DE 10 2005 004 780 B3 discloses a crash structure for a motor vehicle with a crash element of fiber-reinforced plastic. The crash element is designed as a triangular contiguous composite structure by providing the crash element with a support element which extends transversely to the vehicle longitudinal direction and has outer ends for attachment in vehicle longitudinal direction of two further support elements which converge at their opposite ends in a v-shaped manner and are connected to each other via a transverse plate. Web walls extend as stiffening elements in the support elements and form elongate chambers in the support elements.

SUMMARY OF THE INVENTION

The object of the invention is to provide a crash structure for a motor vehicle to enable a sufficient absorption of impact energy in the event of a vehicle collision, while being simple in construction and cost-effective and rigidly connected to a load-bearing structure of the motor vehicle.

In accordance with the invention, the object is achieved by providing a crash structure for a motor vehicle having a crash element which is made at least partially of a fiber composite material, and a support unit having at least one support element and connectable to a load-bearing structure of the motor vehicle, wherein the crash element is made of an undulated component having waves in the vehicle longitudinal direction and an end region which is supported on the load-bearing structure of the motor vehicle at least via the at least one support element of the support unit in the vehicle transverse direction. Advantageous embodiments and refinements of the invention are set forth in the dependent claims.

To provide a crash structure for a motor vehicle for enabling a sufficient absorption of impact energy in the event of a vehicle collision, while being simple in construction and cost-effective and rigidly connected to a load-bearing structure of the motor vehicle, it is proposed in accordance with the invention to make the crash element from an undulated component having waves which extend in vehicle longitudinal direction, and an end portion which is supported on the load-bearing structure of the motor vehicle at least via the support element of the support unit in the vehicle transverse direction. A crash structure relates within the meaning of the invention to a component which is preferably detachably secured to a body of a motor vehicle and able to assist the body with respect to absorption of forces acting on the body of the motor vehicle. A load-bearing structure is to be understood within the meaning of the invention as relating to the body of a motor vehicle with the attached components which at least in part assist the stiffness of the body. An essential advantage of the invention resides in a secure attachment of a crash structure, made at least in part of a fiber composite, upon the load-bearing structure of the vehicle body and a simple integration of the crash structure in the vehicle body. As welding of the crash structure is not possible, other simple connecting techniques, preferably across a large area and thus being reliable, are available, for example screw, glue, or rivet connections or a combination of several connection techniques. The secure attachment of the crash structure to the load-bearing structure of the vehicle body in accordance with the invention withstands even loads which do not ideally act in perpendicular relationship and thus lead to torques and forces. The latter must be reliably absorbed by the attachment of the crash structure in the load-bearing structure of the vehicle body. This is necessary to ensure the function of the crash structure and to prevent a buckling of the undulated crash structure. In addition, the configuration according to the invention allows realization of an increase in the stiffness of the crash structure and a protection of the body of the motor vehicle. A controlled introduction of forces into the crash structure and a targeted distribution of encountered impact energy can be realized into the vehicle. Forces can be transmitted to the body of the motor vehicle via the crash element in a structurally simple and cost-effective manner. The crash element according to the invention improves the stiffness of the body of the motor vehicle, in particular in front and rear areas of the load-bearing structure of the vehicle. The undulated crash element according to the invention can be designed very lightweight but still twist-resistant and therefore is able to introduce into the load-bearing structure of the motor vehicle a large part of forces potentially acting on the vehicle, despite a lightweight construction. As the crash element according to the invention contributes to the stiffness of the load-bearing structure of the motor vehicle, the requirements with respect to the stiffness of the remaining structural components can be reduced. In an advantageous manner, the crash structure according to the invention has in this embodiment, in addition to the low weight and high stiffness, the advantage of a high specific energy absorption capability. Even at an oblique impact, the component has a high stability and very good impact behavior. Due to the orientation of the undulated component, the impact energy acting on the crash structure is optimally absorbed and in particular energy absorption is substantially improved in the event of an oblique impact. Further, the installation of the crash element is limited solely to the attachment of a support element of the support unit of the crash element upon the load-bearing structure of the motor vehicle, and thus saves substantial costs as far as labor and material are involved. In an advantageous manner, an extremely light component can be realized to satisfy a lightweight concept. Moreover, the overall weight of the body can thereby be decreased so that the energy demand for operating the vehicle decreases.

According to an advantageous configuration of the crash structure according to the invention, the at least one support element of the support unit conforms to the wave geometry of the crash element. Advantageously, the support element of the support unit conforms hereby formfittingly to the wave geometry of the crash elements and increases in this way the stability of the crash structure. Thus, the force flow generated by the impact energy in the event of an accident can be optimally absorbed and transmitted to the load-bearing structure of the motor vehicle. In particular, the structural components, to which the crash element of the crash structure is mounted, can be manufactured with a lower material thickness. In this way, both material costs and manufacturing costs of the vehicle body can be reduced.

According to a further advantageous configuration of the crash structure according to the invention, a mounting flange is formed onto the wave geometry of the at least one support element for attachment to the load-bearing structure of the motor vehicle. As a result, a stable and reliable attachment of the crash element to the load-bearing structure of the motor vehicle and thus a stable load path for transmitting a force flow to the load-bearing structure of the motor vehicle with sufficient support for the encountered forces and torques is advantageously established in a simple manner. Moreover, the stiffness of the crash structure and thus of the vehicle body can be increased so as to enable an improved introduction of the impact energy into the crash structure and a more uniform distribution of this impact energy into the crash structure. The crash structure has a high stiffness as a result of the mounting flange according to the invention for attachment to the load-bearing structure of the motor vehicle so as to advantageously increase the stability of the body. Forces can be transmitted to the body via the crash element in a structurally simple and cost-effective manner. The mounting flange according to the invention for attachment to the load-bearing structure of the motor vehicle thus additionally improves the stiffness of the body of the motor vehicle.

It is particularly advantageous to form a connection flange onto the crash element for attachment to the load-bearing structure of the motor vehicle. Advantageously, this results in a simple way in a further increase of the stability and the stress resistance of the attachment of the crash element to the load-bearing structure of the motor vehicle and thus in a further stable load path which is provided for transmitting of force flow to the load-bearing structure of the motor vehicle and in which also torques and forces can be absorbed which act not only from one direction on the crash element. As a result, the single-piece crash element directly absorbs, without additional attachment parts, impact energy that has not been absorbed in the event of a collision and/or directly absorbs forces and vibrations that have been introduced into the vehicle body during travel and/or improves their transmission and dispersion to the vehicle body. Advantageously, the arrangement of the connection flange in accordance with the invention for attachment to the load-bearing structure results in an improvement of the force introduction into the carcass.

In an embodiment of the crash structure according to the invention, the support unit has two support elements in at least partly surrounding relationship to the crash element. By providing on the crash structure a second formfitting support element in opposition to the first formfitting support element, a further increase in the twist stiffness of the crash structure is realized. As a result, an even better absorption of impact energy introduced in the vehicle body in the event of an accident is achieved. An additional force path can be provided via the second support element to enable the crash structure of the motor vehicle to absorb impact energy introduced into the load-bearing structure. In particular, the material thickness of the crash element can be optimally suited to the force patterns within the crash structure. Advantageously the provision of the two support elements results in a material accumulation in the areas of the crash structure that are exposed to forces so as to prevent buckling in the presence of the impact energy of the crash element according to the invention.

It is further proposed that the end portion of the undulated component is chamfered. Advantageously, the force pattern of the impact energy caused by an accident is thus transmitted in a desired way to the load-bearing structure of the motor vehicle so that the force pattern in the end portion of the undulated component has a controlled stress-free deflection.

It is also proposed to form the at least one support element of the support unit, which support element extends in vehicle transverse direction, onto the crash element. This results advantageously in a stable and stress-resistant attachment of the crash element according to the invention to the load-bearing structure of the motor vehicle and thus in a reliable load path for transmission of the force flow to the load-bearing structure of the motor vehicle. As a result, an advantageous structurally simple improvement in the stiffness of the crash element and thus of the vehicle body can be realized to thereby attain an improved introduction of the impact energy into the crash element and a more uniform distribution of this impact energy. The support element of the support unit in accordance with the invention for attachment to the load-bearing structure of the motor vehicle provides the crash element with a high stiffness, thereby advantageously realizing an increase in the stability of the vehicle body. Forces can be transmitted to the body via the crash element in a structurally simple and cost-effective manner. Thus, the support element of the support unit in accordance with the invention for attachment to the load-bearing structure of the motor vehicle increases overall the stiffness of the body of the motor vehicle.

A preferred implementation of the crash structure according to the invention provides that one edge of the undulated component is chamfered. Advantageously, the force pattern of the impact energy in the event of an accident is hereby diverted to the load-bearing structure of the motor vehicle so that stress peaks can be reduced in the edges of the undulated component.

In one embodiment of the crash structure according to the invention, the at least one support element to which the mounting flange for attachment to the load-bearing structure of the motor vehicle is formed is arranged on a side of the crash element in opposition to the chamfered edge. Advantageously, the entire end portion of the crash element receives hereby a high stiffness and stability to optimally protect the crash element against buckling and thus to ensure a load path for transmitting the force flow to the load-bearing structure of the motor vehicle. This has the advantage that the crash element is able to optimally absorb the impact energy caused by an accident and to further transmit it to the load-bearing structure of the motor vehicle. This advantageously results in a structurally simple increase in the stiffness of a crash element and thus of the body of the motor vehicle to thereby enable a more uniform distribution of the impact energy into the crash element.

In a further embodiment of the crash structure according to the invention, a mounting flange of a support element and a connection flange of the crash element or two mounting flanges of two support elements embrace a crossbeam of the load-bearing structure of the motor vehicle at least in part. The attachment of the crash element on both sides of the crossbeam of the load-bearing structure of the motor vehicle via a mounting flange of a support element and a connection flange of the crash element or two mounting flanges of two support elements provides the crash structure with a particularly good stiffness and thereby a particularly stable attachment to the load-bearing structure of the motor vehicle. The impact energy encountered during a collision can be conducted to the crossbeam of the load-bearing structure of the motor vehicle via the flanges extending on both sides and thus split up. This results advantageously in a further improvement of the force introduction into the load-bearing structure of the motor vehicle.

BRIEF DESCRIPTION OF THE DRAWING

Advantageous embodiments of the invention are illustrated in the drawing and will be described hereinafter.

It is shown in.

DETAILED DESCRIPTION OF PREFERRED EMBODIMENTS

Figure 1:
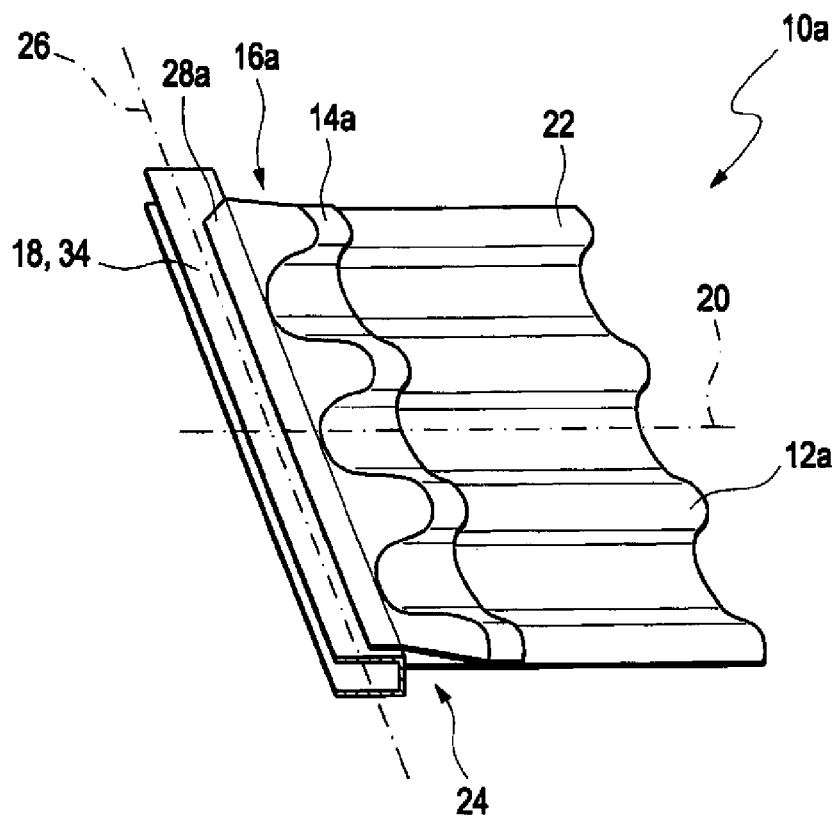
FIG. 1 a perspective illustration of a first exemplary embodiment of a crash structure according to the invention for a motor vehicle having a undulated crash element and a support unit having a support element and resting on a crossbeam for connection with the load-bearing structure of the motor vehicle, FIG. 2 a perspective illustration of a second exemplary embodiment of a crash structure according to the invention for a motor vehicle having a undulated crash element and a support unit having two support elements which partly embrace a crossbeam of a load-bearing structure of the motor vehicle, FIG. 3 an exploded illustration of the crash structure of FIG. 2 with the two support elements of the support unit, between which the undulated crash element can be partly received, FIG. 4 a detailed side illustration of the crash structure from FIG. 2 and FIG. 3 by way of an exploded illustration, FIG. 5 a longitudinal section through the crash structure of FIGS. 2 to 4 in the region of a wave crest, FIG. 6 a perspective illustration of a third exemplary embodiment of a crash structure according to the invention for a motor vehicle, having an undulated crash element to which a connection flange is formed, and a support unit having a support element to which a mounting flange is formed, with the flanges used for attachment to a load-bearing structure of a motor vehicle, FIG. 7 a perspective illustration of a fourth exemplary embodiment of a crash structure according to the invention for a motor vehicle, having an undulated crash element with an edge which is chamfered, and a support unit having a support element to which a mounting flange is formed, FIG. 8 a perspective illustration of a fifth exemplary embodiment of a crash structure according to the invention, having a crash element with a chamfered undulated end region and with a support element of the support unit extending in vehicle transverse direction and formed onto the crash element, FIG. 9 a perspective illustration of a sixth exemplary embodiment of a crash structure according to the invention, having an undulated crash element and a support component of a support unit, with a mounting flange of the support element and a connection flange of the crash element embracing a crossbeam of the load-bearing structure of the motor vehicle, FIG. 10 a perspective illustration of the crash structure of FIG. 9 by way of a rear view, FIG. 11 a perspective illustration of the crash structure of FIG. 9 by way of a side view.
Figure 2:
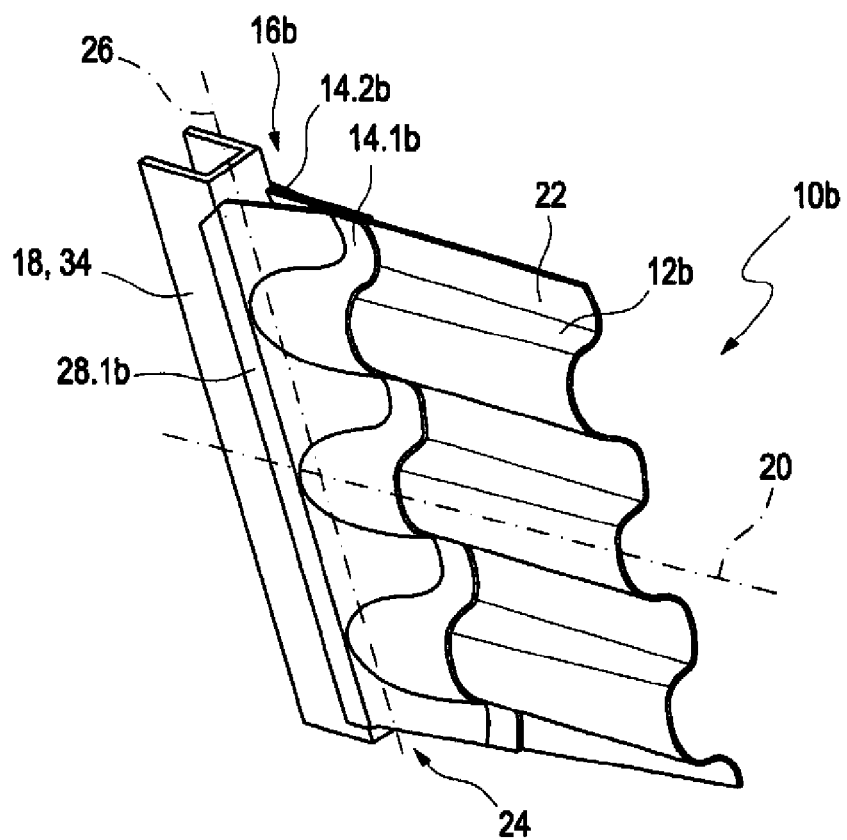
Figure 3:
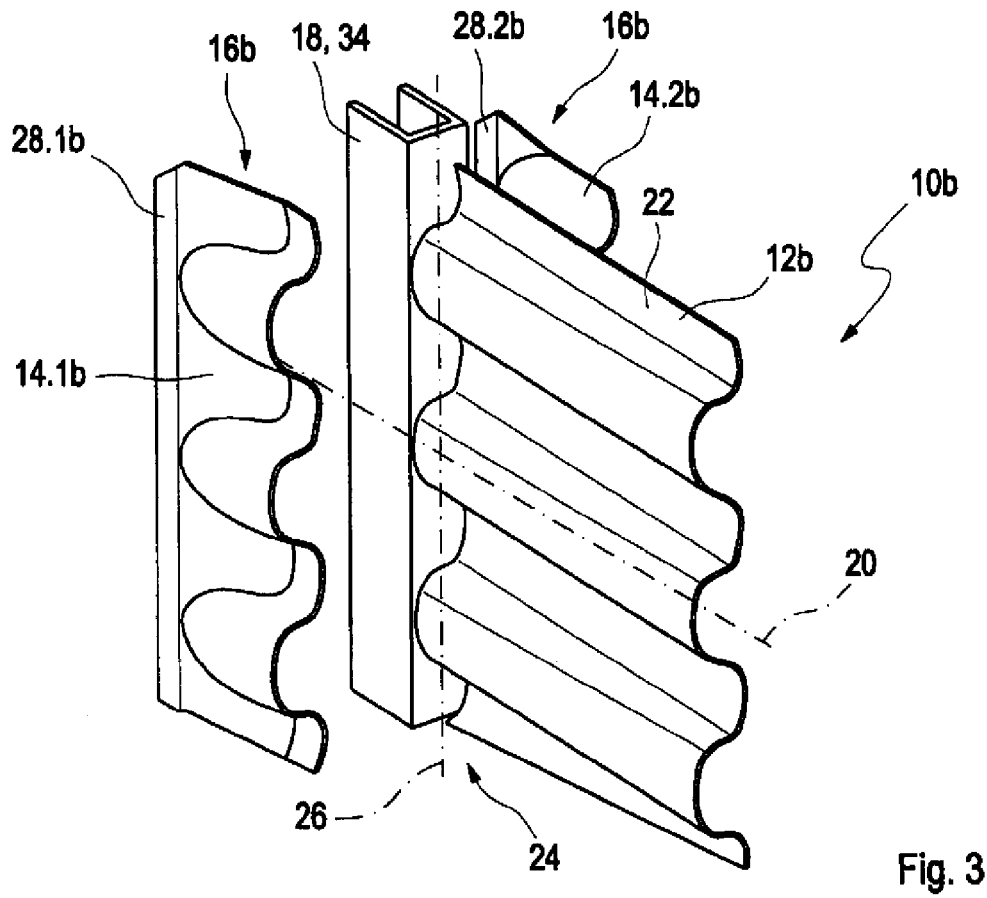

As is apparent from FIGS. 1 to 11, a crash structure 10a, 10b, 10c, 10d, 10e, 10f for a motor vehicle includes a crash element 12a, 12b, 12c, 12d, 12e, 12f made of a fiber composite, and a support unit 16a, 16b, 16c, 16d, 16e, 16f which has at least one support element 14a 14.1b, 14.2b, 14c, 14d, 14e, 14f and is connectable to a load-bearing structure 18 of the motor vehicle.

To provide for a motor vehicle a crash structure 10a, 10b, 10c, 10d, 10e, 10f which enables a sufficient absorption of impact energy in the event of a vehicle collision while being simple and cost-effective in construction and rigidly attached to a load-bearing structure 18 of the motor vehicle, it is proposed according to the invention to make the crash element 12a, 12b, 12c, 12d, 12e, 12f from an undulated component having waves 22 which extend in vehicle longitudinal direction 20 and an end region 24 which is supported on the load-bearing structure 18 of the motor vehicle via the at least one support element 14a, 14.1b, 14.2b, 14c, 14d, 14e, 14f, extending in the vehicle transverse direction 26, of the support unit 16a, 16b, 16c, 16d, 16e, 16f.

Figure 4:
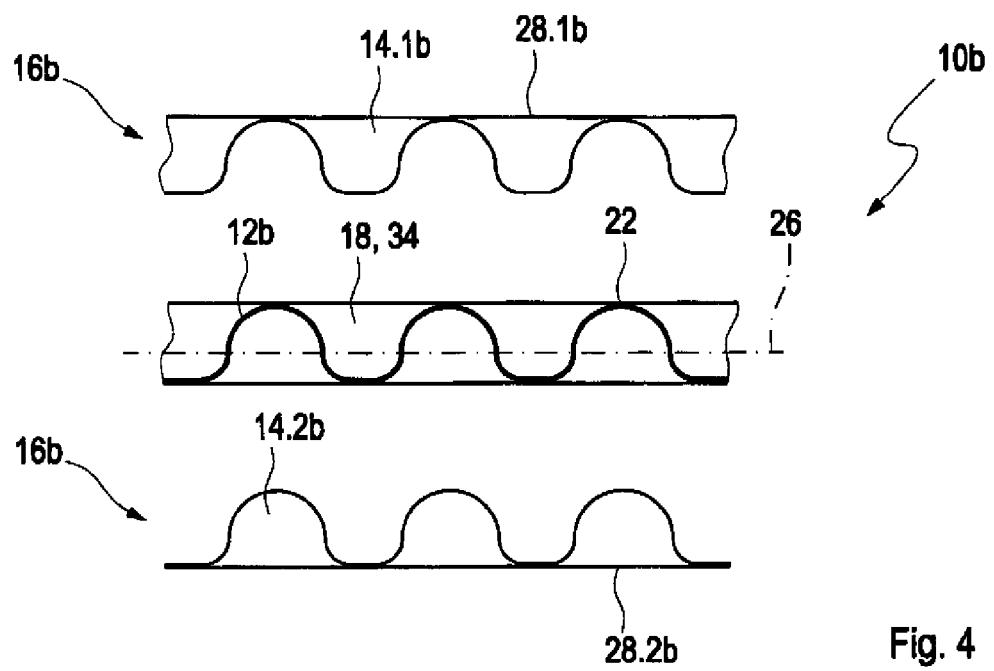
Figure 5:
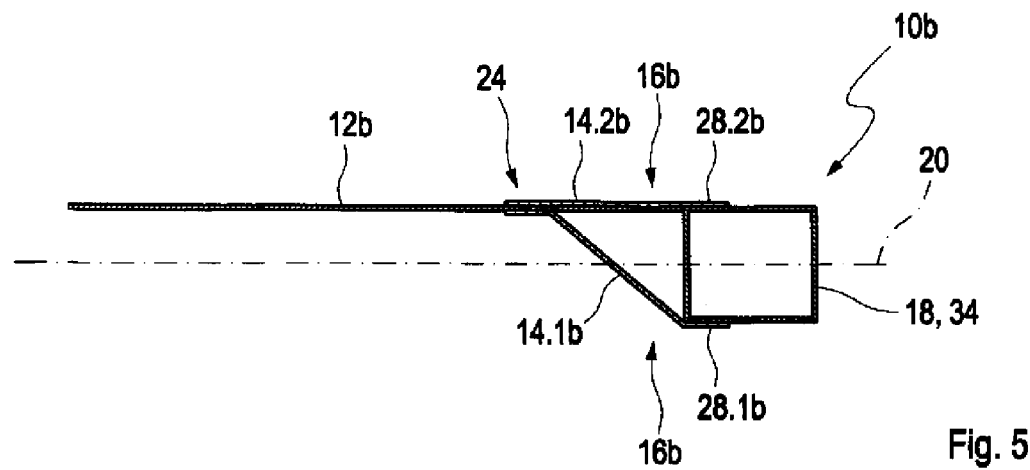
Figure 6:
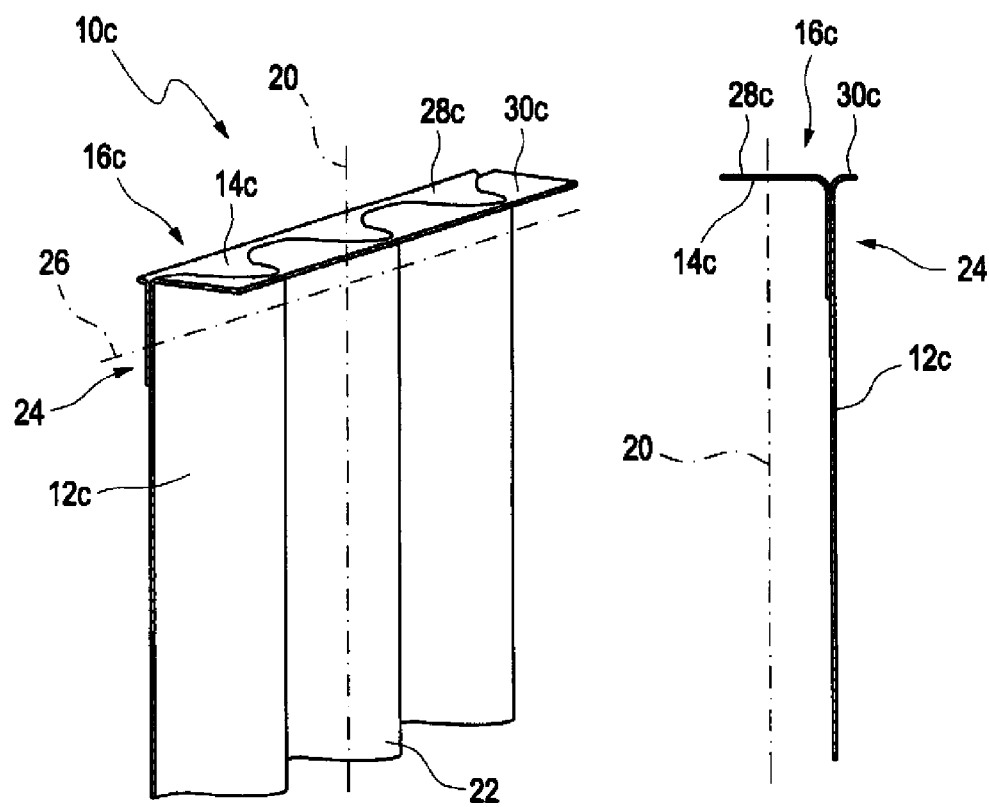
Figure 7:
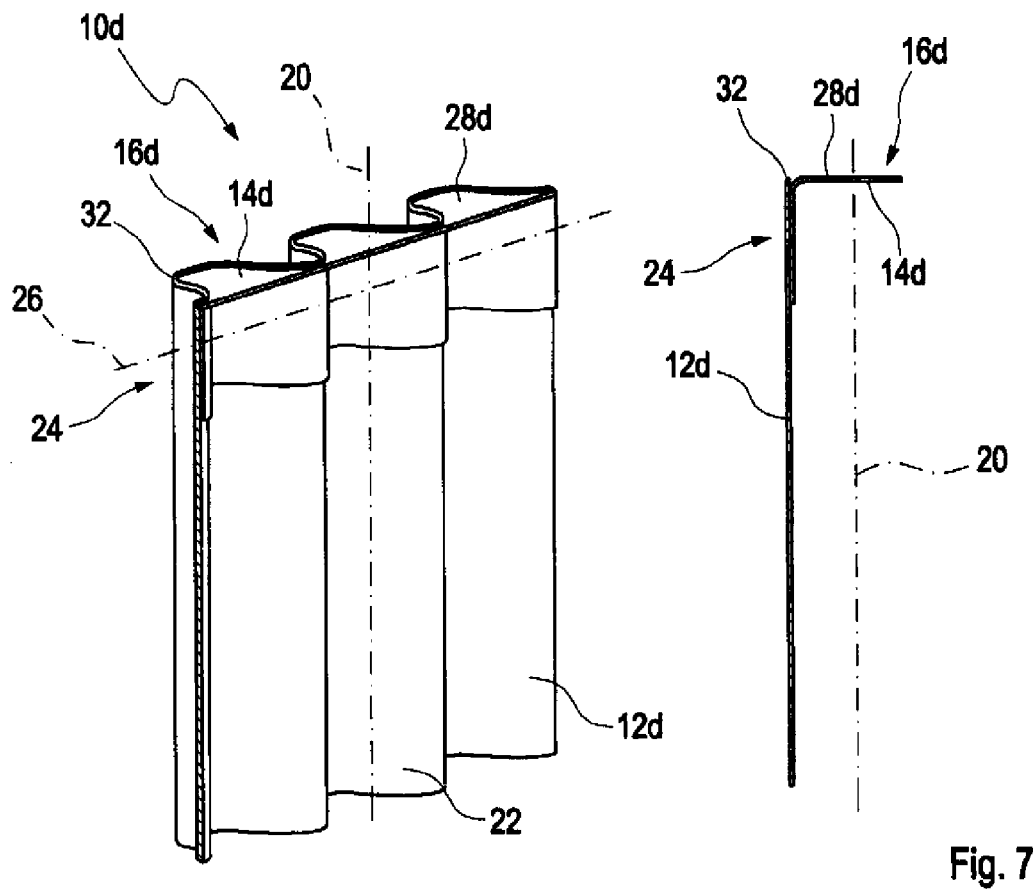
Figure 8:
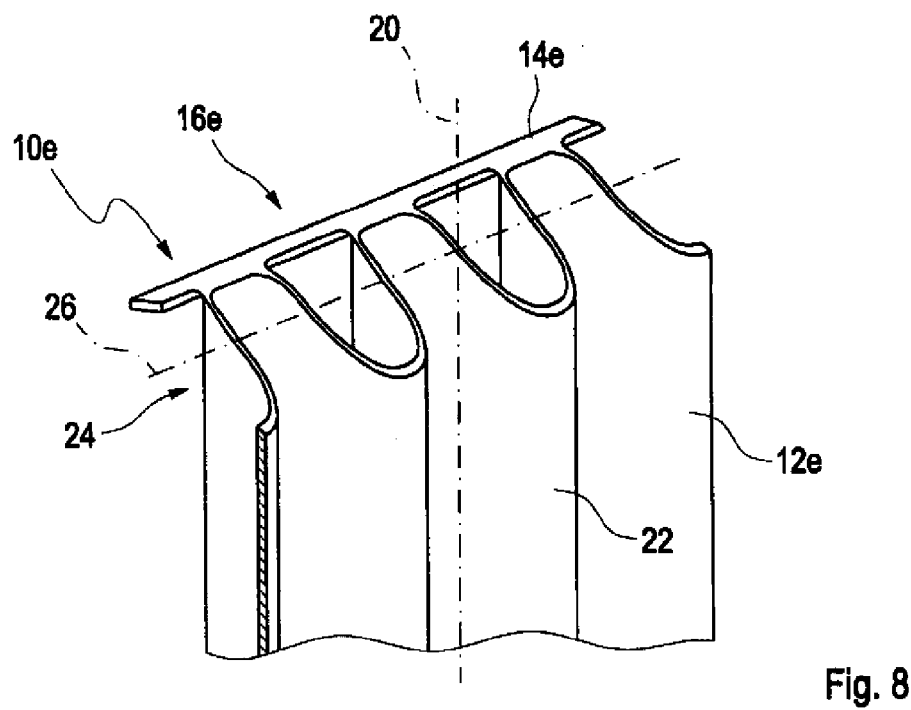
Figure 9:
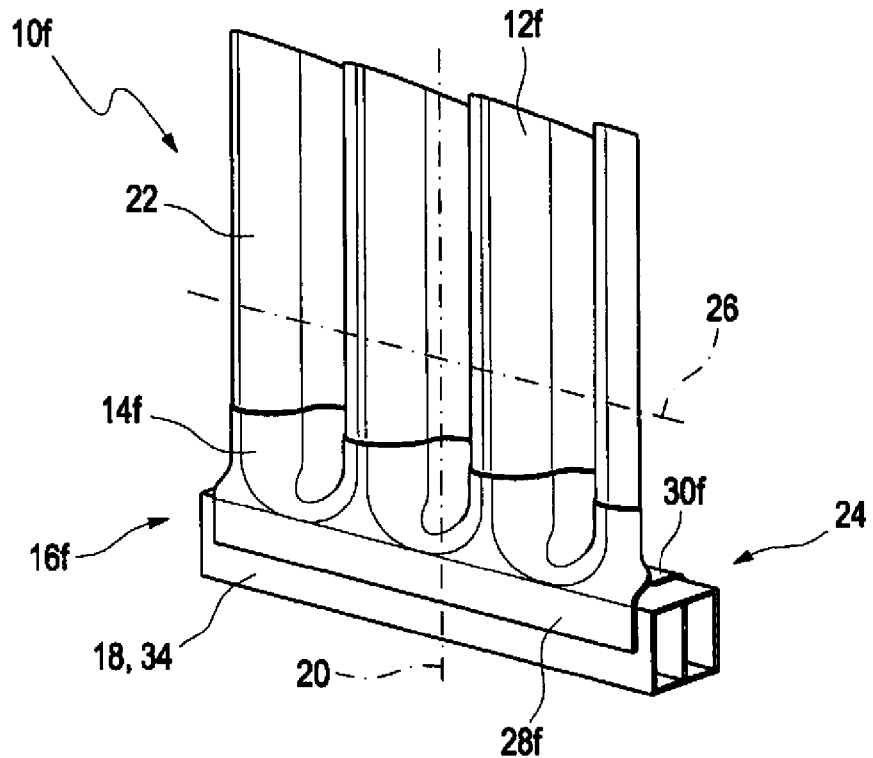
Figure 10:
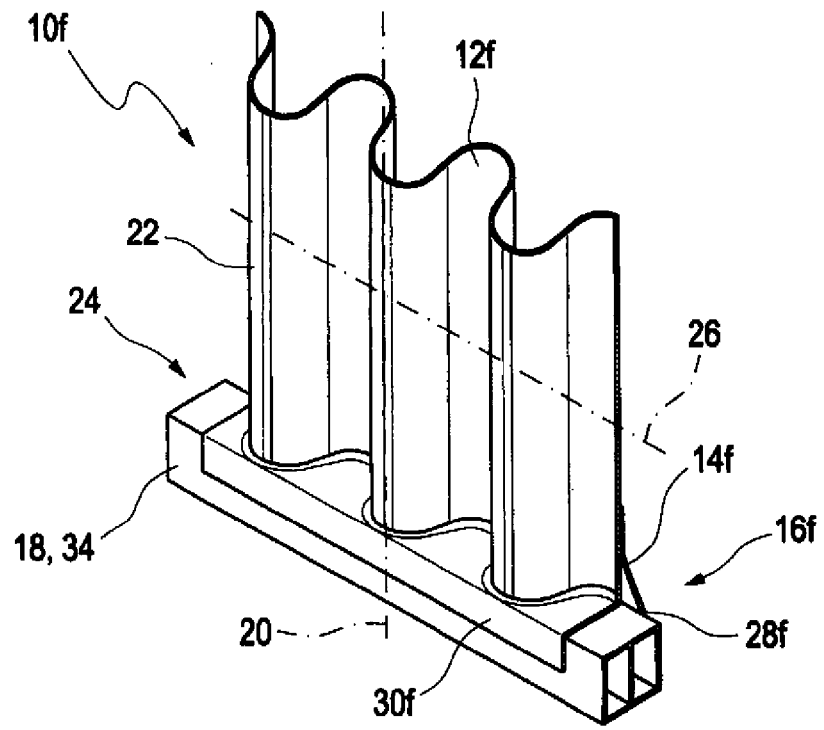
Figure 11:
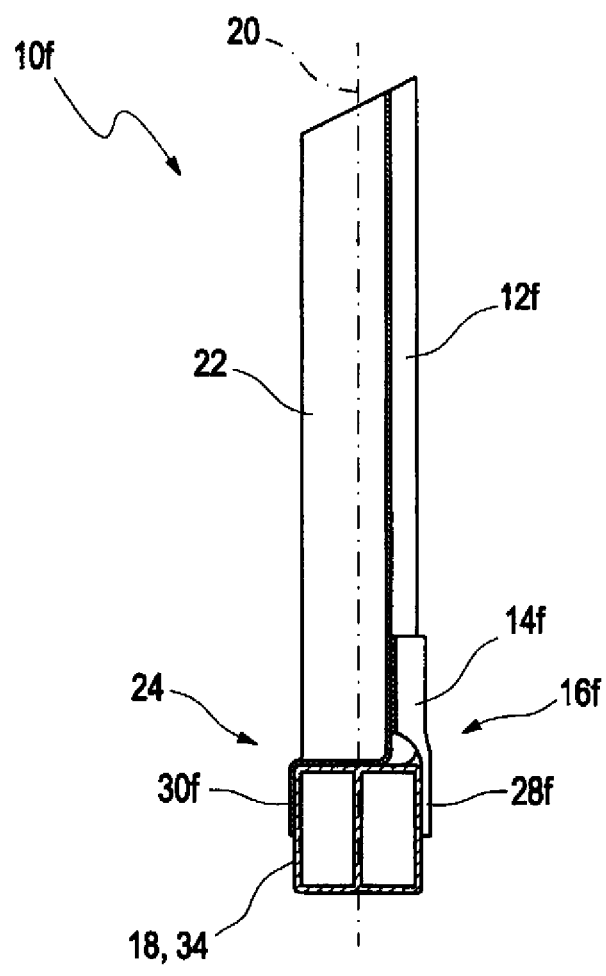

FIGS. 1 to 11 show six exemplary embodiments of the crash structure 10a, 10b, 10c, 10d, 10e, 10f for a motor vehicle, with FIG. 1 showing a first exemplary embodiment, FIGS. 2 to 5 showing a second exemplary embodiment, FIG. 6 showing a third exemplary embodiment, FIG. 7 showing a fourth embodiment, FIG. 8 showing a fifth exemplary embodiment, and FIG. 9 to FIG. 11 showing a sixth exemplary embodiment.

FIGS. 1 and 6 to 11 show in the first, third, fourth, fifth and sixth exemplary embodiments of a crash structure 10a, 10c, 10d, 10e, 10f for a motor vehicle with a crash element 12a, 12c, 12d, 12e, 12f and a support unit 16a, 16c, 16d, 16e, and 16f which has a support element 14a, 14c, 14d, 14e, 14f and is connectable to a load-bearing structure 18 of the motor vehicle. FIGS. 2 to 5 show a second embodiment of a crash structure 10b for a motor vehicle with a crash element 12b and support unit 16b which has two support elements 14.1b 14.2b and is connectable to a load-bearing structure 18 of the motor vehicle.

In the exemplary embodiments according to FIGS. 1 to 7 and FIGS. 9 to 11, the at least one support element 14a, 14.1b, 14.2b, 14c, 14d, 14f of the support unit 16a, 16b, 16c, 16d, 16f conforms to the wave geometry of the crash element 12a, 12b, 12c, 12d, 12f. The at least one support element 14a, 14.1b, 14.2b, 14c, 14d, 14f of the support unit 16a, 16b, 16c, 16d, 16f rests hereby flatly in the end portion 24 upon the undulated crash element 12a, 12b, 12c, 12d, 12f. In FIGS. 1 to 5, the at least one support element 14a 14.1b, 14.2b, 14f of the support unit 16a, 16b, 16f protrudes in the end region 24 beyond the crash structure 10a, 10b, 10f of the crash element 12a, 12b, 12f and covers at least in part the load-bearing structure 18 of the motor vehicle. In FIGS. 6 and 7, the at least one support element 14c, 14d of the support unit 16c, 16d terminates flush in the end region 24 with the crash structure 10c, 10d of the crash element 12c, 12d. FIG. 4 illustrates an exploded view of the second exemplary embodiment of the crash structure 10b and shows the two support elements 14.2b 14.1b of the support unit 16b, between which the undulated crash element 12b is received in part. The end face of the crash element 12b adjoins flush upon the load-bearing structure 18 of the motor vehicle. FIG. 5 shows by way of a longitudinal section through the crash structure 10b from FIGS. 2 to 4 the flat attachment of the undulated crash element 12b upon the support unit 16b in the region of a wave crest to enable an attachment of the crash element 12b of the crash structure 10b to the load-bearing structure 18 of the motor vehicle.

In the exemplary embodiments according to FIGS. 1 to 7 and FIGS. 9 to 11, a mounting flange 28a, 28.1b, 28.2b, 28c, 28d, 28f is formed upon the wave geometry of the at least one support element 14a, 14.1b, 14.2b, 14c, 14d, 14f, for attachment to the load-bearing structure 18 of the motor vehicle. The mounting flange 28a, 28.1b, 28.2b, 28c, 28d, 28f is used for the attachment of the crash element 12a, 12b, 12c, 12d, 12f to the load-bearing structure 18 of the motor vehicle. In the exemplary embodiments according to FIGS. 2 to 7 and FIGS. 9 to 11, the mounting flange 28.1b 28.2b, 28c, 28d, 28f according to the invention extends perpendicular to the undulated crash element 12b, 12c, 12d, 12f, and parallel to the load-bearing structure 18 of the motor vehicle. In the first exemplary embodiment according to FIG. 1, the mounting flange 28a according to the invention extends parallel to the undulated crash element 12a. The attachment of the mounting flange 28a to the load-bearing structure 18 of the motor vehicle is hereby realized by resting upon a crossbeam 34 of the load-bearing structure 18, whereas in the exemplary embodiments according to FIGS. 2 to 5 and FIGS. 9 to 11, the attachment of the mounting flange 28.1b, 28f to the load-bearing structure 18 of the motor vehicle is implemented in such a way that the crossbeam 34 is at least in part embraced by the support unit 16b, 16f. In the third and fourth exemplary embodiments of the crash structure 10c, 10d according to FIGS. 6 and 7, the mounting flange 28c, 28d is identical in construction and is flush-mounted to the end face of the crash element 12c, 12d, with the undulated hollow space structure at the end face of the crash element 12c, 12d being flatly closed to the outside by the mounting flange 28c, 28d.

In the exemplary embodiments according to FIG. 6 and FIGS. 9 to 11, a connection flange 30c, 30f is formed on the crash element 12c, 12f for attachment to the load-bearing structure 18 of the motor vehicle. To further increase stability and twist stiffness of the crash structure 10c, 10f and to keep the number of components low, the connection flange 30c, 30f is formed in one piece on the undulated crash element 12c, 2f of the crash structure 10c, 10f according to the invention. As in the third exemplary embodiment according to FIG. 6, it can be seen that the connection flange 30c closes the open hollow space structure on the end face of the crash structure 10c of the crash element 12c and thereby increases the attachment surface upon the load-bearing structure 18 of the motor vehicle and the dimensional stability in the end region 24 of the crash structure 10c. In the sixth exemplary embodiment according to FIGS. 9 to 11, the connection flange 30f of the crash element 12f embraces at least in part two surfaces of a crossbeam 34 of the load-bearing structure 18 which are arranged at a right angle relative to one another, to thereby form a very large support and attachment surface upon the load-bearing structure 18 of the motor vehicle.

In the second exemplary embodiment of FIGS. 2 to 5, the support unit 16b has two support elements 14.1b, 14.2b which embrace the undulated crash element 12b at least in part. This means that the undulated crash element 12b is arranged between the two support elements 14.1b, 14.2b of the support unit 16b. Attached to the crash element 12b in the end region 24 of the crash structure 10b are the two support elements 14.1b, 14.2b of the support unit 16b. Each of the support elements 14.1b, 14.2b includes a mounting flange 28.1b, 28.2b for connection to the load-bearing structure 18 of the motor vehicle or a crossbeam 34 of the load-bearing structure 18 of the motor vehicle. As can be seen from FIG. 2, the support elements 14.1b, 14.2b of the support unit 16b form-fittingly embrace the undulated crash element 12b on both sides so that the crash structure 10b is not only stable in the end region 24, but also securely fixed in place even when the forces and torques do not act perpendicular on the crash structure 10b.

In the fifth embodiment according to FIG. 8, the crash structure 10e is formed in one piece. Further, the at least one support element 14e of the support unit 16e extending in the vehicle transverse direction 26 is formed on the crash element 12e. Preferably, the support element 14e is formed on an end face of the crash element 12e, and preferably at a right angle with respect to the crash element 12e. Advantageously, the end region 24 of the crash element 12e, configured as undulated component, is chamfered. Preferably, the chamfer is configured at an angle of 45°. In the crash structure 10e, the wave crests in the end region 24 are chamfered and configured open in such a way that openings are formed in the crash element 12e between the support element 14e and waves 22 extending in the vehicle longitudinal direction 20.

In the fourth exemplary embodiment according to FIG. 7, an edge 32 of the undulated component 12d is chamfered. Preferably, the chamfer is configured at an angle of 45°. Arranged at a side of the crash element 12d in opposition to the chamfered edge 32 is the at least one support element 14d, to which the mounting flange 28d is formed for attachment to the load-bearing structure 18 of the motor vehicle. The mounting flange 28d is flush-mounted to the end face of the crash element 12d, with the undulated hollow space structure of the crash element 12d being closed flatly to the outside at the end face of the crash element 12d by the mounting flange 28d. The overlap of the undulated mounting flange 28d forms in the end region 24 to the crash element 12d a formfitting connection which provides the crash structure 10d with additional stability in this region.

In the exemplary embodiments according to FIGS. 2 to 5 and FIGS. 9 to 11, two mounting flanges 28.1b, 28.2b of two support elements 14.1b, 14.2b or a mounting flange 28f of a support element 14f and a connection flange 30f of the crash element 12f embrace, at least in part, a crossbeam 34 of the load-bearing structure 18 of the motor vehicle. While the second exemplary embodiment according to FIGS. 2 to 5 still provides an assembly of two support elements 14.1b, 14.2b, assembly work is halved in the sixth exemplary embodiment according to FIGS. 9 to 11 with only one support element 14f, since the support upon the crossbeam 34 of the load-bearing structure 18 is realized on the side opposite to the support element 14f via a connection flange 30f which is already formed on the crash element 12f. This results in both a large-area formfitting connection of the support unit 16b, 16f to the crash element 12b, 12f and a large-area formfitting connection of the crash structure 10b, 10f with the crossbeam 34 of the load-bearing structure 18 of the motor vehicle. This connection can be realized in a simple and therefore reliable manner, for example by a screw, adhesive or riveted connection or a combination of several connection techniques.

What is claimed is:

1. A crash structure for a motor vehicle, comprising:
   a support unit having at least one support element and connectable to a load-bearing structure of the motor vehicle; and
   a crash element made at least partially of a fiber composite material, said crash element having waves in a vehicle longitudinal direction and an end region which is supported on the load-bearing structure of the motor vehicle at least via the at least one support element of the support unit in a vehicle transverse direction, said at least one support element of the support unit being configured to conform to a wave geometry of the crash element and to rest flatly upon the end region of the crash element.

2. The crash structure of claim 1, further comprising a mounting flange formed on the wave geometry of the at least one support element for attachment to the load-bearing structure of the motor vehicle.

3. The crash structure of claim 1, further comprising a connection flange formed on the crash element for attachment to the load-bearing structure of the motor vehicle.

4. The crash structure of claim 1, wherein the support unit comprises two of said support element for at least partially embracing the crash element.

5. The crash structure of claim 4, wherein each of the support elements has a mounting flange, with the mounting flange of one of the support elements and the mounting flange of the other one of the support elements embracing, at least in part, a crossbeam of the load-bearing structure of the motor vehicle.

6. The crash structure of claim 1, wherein the end region of the crash element is chamfered.

7. The crash structure of claim 1, wherein the at least one support element of the support unit extends in the vehicle transverse direction and is formed onto the crash element.

8. The crash structure of claim 1, wherein the crash element has a chamfered edge.

9. The crash structure of claim 8, further comprising a mounting flange formed on the wave geometry of the at least one support element for attachment to the load-bearing structure of the motor vehicle, said at least one support element being arranged on a side of the crash element in opposition to the chamfered edge of the crash element and has formed thereon the mounting flange.

10. The crash structure of claim 1, wherein the at least one support element has a mounting flange, and the crash element has a connection flange, said mounting flange of the at least one support element and said connection flange of the crash element embracing, at least in part, a crossbeam of the load-bearing structure of the motor vehicle.

* * * * *